United States Patent [19]

Viken

[11] Patent Number: 5,318,080

[45] Date of Patent: Jun. 7, 1994

[54] TRANSMISSION FLUID CHANGER

[76] Inventor: James P. Viken, 13911 Ridgedale Dr., Suite 303C, Minnetonka, Minn. 55343

[21] Appl. No.: 781,322

[22] Filed: Oct. 23, 1991

[51] Int. Cl.$^5$ ............................................. F16N 33/00
[52] U.S. Cl. ....................................... 141/98; 141/114; 141/65; 220/571; 184/1.5; 184/106
[58] Field of Search ................... 220/571, 573; 141/98, 141/114, 65; 184/1.5, 106

[56] References Cited

U.S. PATENT DOCUMENTS

| | | | |
|---|---|---|---|
| 4,095,673 | 6/1978 | Takeuchi | 184/1.5 |
| 4,114,644 | 9/1978 | Piper | 137/565 |
| 4,951,784 | 8/1990 | Bedi | 184/1.5 |
| 4,958,666 | 9/1990 | Kocourek et al. | 141/114 |
| 5,056,621 | 10/1991 | Trevino | 184/1.5 |
| 5,062,500 | 11/1991 | Miller et al. | 184/106 |
| 5,092,429 | 3/1992 | Linares et al. | 184/1.5 |

Primary Examiner—Ernest G. Cusick

[57] ABSTRACT

Fluid changing in an automatic transmission by opening the cooler line and draining used fluid, at the flow of normal circulation, out of the cooler line from the transmission into a drain receptacle for receiving used fluid and simultaneously supplying fresh fluid, from a pressurized supply receptacle, into the cooler return line to the transmission at a similar controlled rate that is equal or greater than the rate of flow of the used fluid into the drain receptacle.

13 Claims, 4 Drawing Sheets

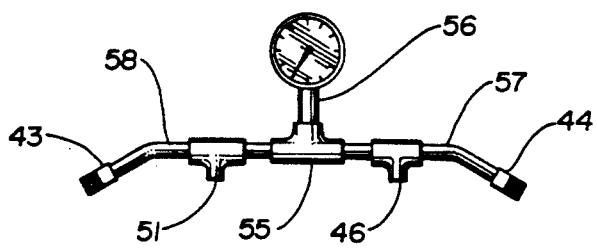
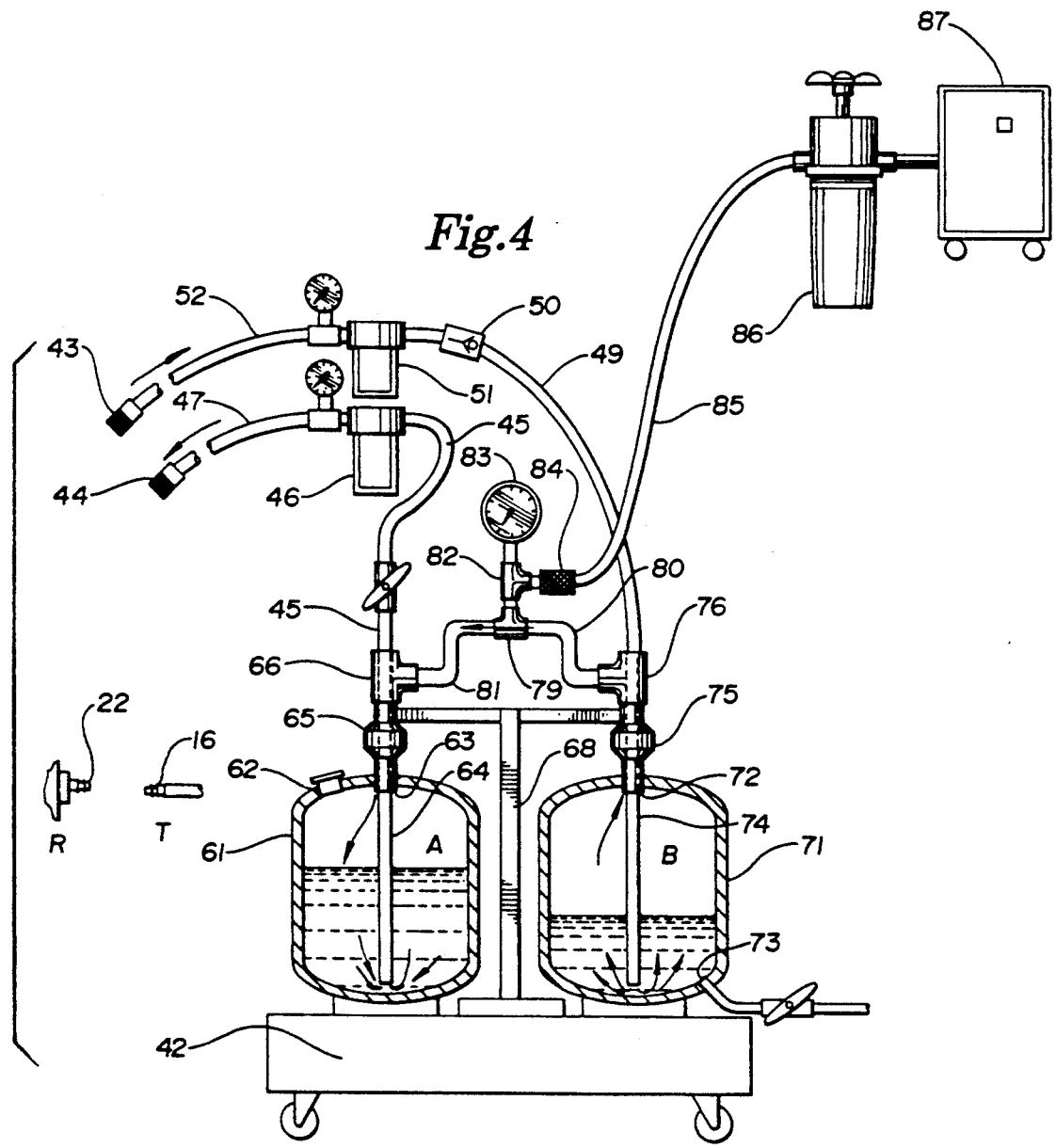

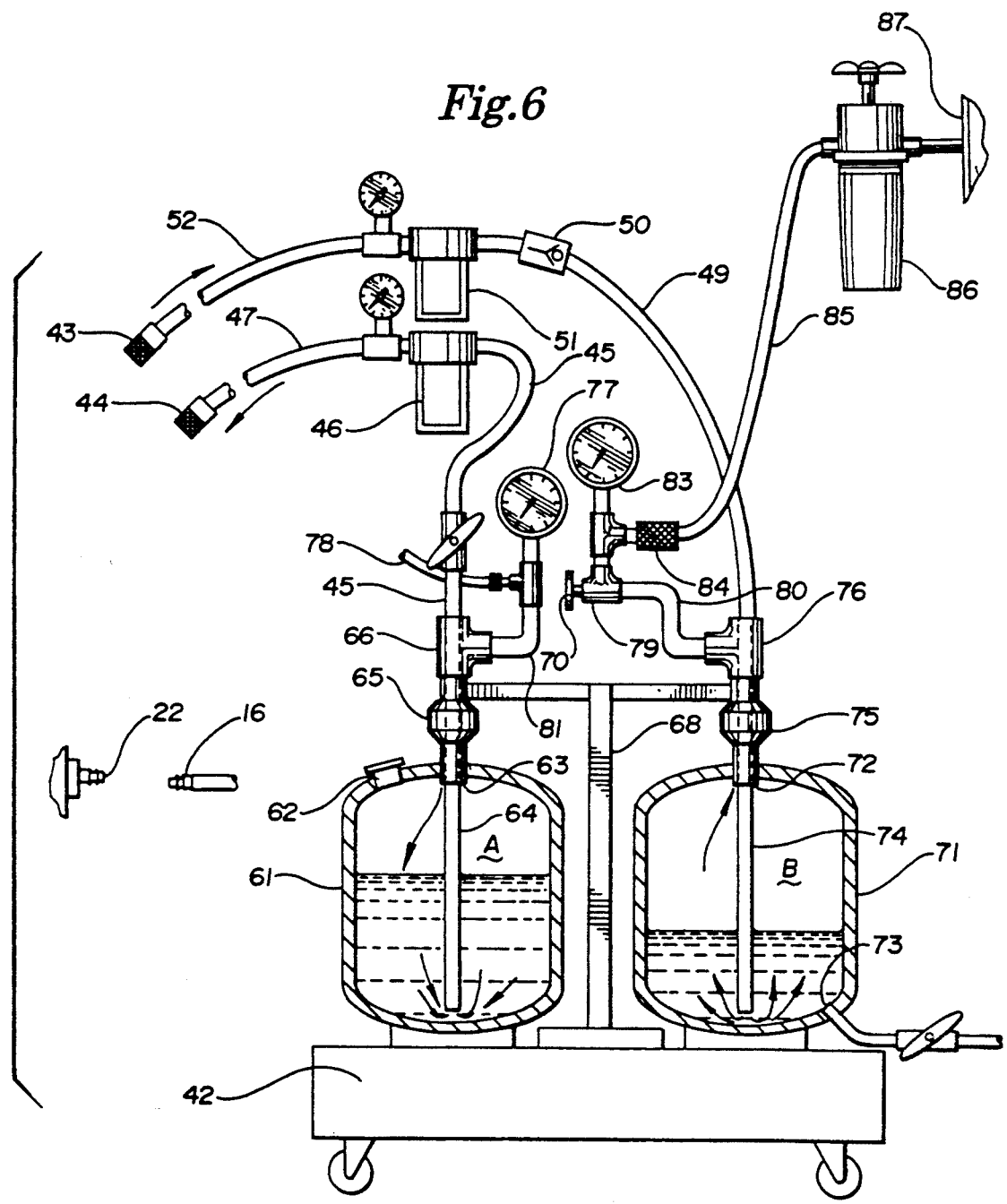

TRANSMISSION FLUID CHANGER

BACKGROUND OF THE INVENTION

1. Field of the Invention

This invention relates generally to fluid replacing apparatus and is more particularly directed to apparatus for replacing the fluid in automatic transmissions having sealed, or inaccessible hydraulic torque converters and which include a fluid circulating pump and inlet and outlet ports for circulation of the hydraulic transmission fluid to fluid coolers and the like.

2. Description of the Prior Art

The following is a list of prior art encountered in the course of a search of the prior art with which my invention is concerned.

| U.S. Pat. No. Title | Issued Date | Inventor |
| --- | --- | --- |
| 1,829,173 COMBINED FLUSHER AND LUBRICANT DISPENSER | | A. L. Wirtz |
| 1,884,820 METHOD OF CLEANING LUBRICANT CONTAINERS | Oct. 25, 1932 | W. L. Osborne |
| 3,216,527 APPARATUS FOR CHANGING CRANKCASE OIL | Nov. 9, 1965 | O. G. Lewis |
| 3,447,636 AUTOMATIC OIL EXCHANGING SYSTEM | June 3, 1969 | R. J. Bonfilio |
| 3,513,941 FLUID CHANGE MEANS FOR AUTOMATIC TRANSMISSIONS | May 26, 1970 | N. J. Becnel |
| 4,095,672 APPARATUS FOR REMOVAL OF LUBRICATING COMPOSITION AND METHODS FOR USING SAME | Jun. 20, 1978 | F. J. Senese |
| 4,331,185 TRANSMISSION FILLER ASSEMBLY | May 25, 1982 | J. D. Rinaldo et al. |
| 4,745,989 VALVE FOR DRAINING AUTOMATIC TRANSMISSION FLUID AND METHOD OF USING SAME | May 24, 1988 | J. G. DiMatteo |

Of the above references, some of which pertain to other activities involving the addition or removal of fluid from various and sundry mechanisms, the Becnel U.S. Pat. No. 3,513,941 for FLUID CHANGE MEANS FOR AUTOMATIC TRANSMISSIONS and the DiMatteo U.S. Pat. No. 4,745,989 for VALVE FOR DRAINING AUTOMATIC TRANSMISSION FLUID AND METHOD OF USING SAME are believed to be the most directly pertinent to my invention. In Becnel and DiMatteo, a method and apparatus are described for draining and refilling the fluid in a motor vehicle automatic transmission. The similarities between Becnel and DiMatteo are almost surprising in that each of them provides a cooler outlet and some arrangement for adding fluid to the transmission either through the filler port or to a return line from the transmission fluid cooler. When a transmission cooler line is opened and drained with no restriction the rate of flow at which the fluid is exhausted rapidly increases and fluid is pumped out of the transmission and torque converter much faster than it can be replaced by being pumped in the return line as specified in Becnel's invention, resulting in a disruption of the usual internal and external fluid flow rates and flow patterns which occur normally; this disruption includes an intermittent, recurrent starvation condition to certain internal transmission components resulting in undue stress and frequent damage to those components. Becnel's invention appears to have the capability to supply fresh fluid into the transmission through the return line from the cooler back to the transmission at a predetermined, pre-selected flow rate, but his invention allowed no clear means of balancing and/or matching that flow rate to the rate at which fluid is normally circulated through the cooler line back to the transmission or regulating the exhausting of aged fluid into the waste receptacle to produce a balanced substitution of fresh fluid for aged fluid.

Exhausting aged fluid through an open, unrestricted transmission cooler line results in a flow rate to and out of that opening which is far in excess of the rate at which fluid is normally circulated through the cooler, because the usual and significant flow resistance provided by the return line to the transmission itself and the internal down-line components has been eliminated by interrupting/opening the transmission cooler line.

DiMatteo's invention specifies an unrestricted exhausting of aged fluid through an open cooler line as Becnel's does and also results in a great increase in rate of flow of fluid through the line leading from the transmission to the cooler line at the point it is exhausted, much greater than normally occurring with a closed cooler line in normal closed-loop circulation. Not only does this result in emptying of the transmission pan and starvation of the internal pump(s) and torque converter as well as other internal components, but Dimatteo's invention does not specify any pumping of fresh fluid in the return line to the transmission thus, completely disrupting internal and external flow rates and flow patterns and resulting in complete lack of lubrication to the bearings and internal parts of the transmission which receive fluid from the line returning from the cooler to the transmission. DiMatteo specifies adding fresh fluid as the aged fluid when drained out of the open, unrestricted transmission cooler line, by manually pouring it through the filler tube with a poorly metered, poorly controlled method not balanced to rate of exhaust flow.

In the course of arriving at the method and apparatus of my invention, the concepts present in Becnel and DiMatteo were utilized in a similar manner and it was discovered that most, if not all, of the transmissions operated upon became excessively hot or were subject to internal damage to the fluid seals, rear bearings, or other internal components because it was impossible to maintain equality between the fluid added and the fluid drained, because it was impossible to maintain normal fluid flow rates and flow patterns external to and internal within the transmission and its component parts. In other words, what is lacking in Becnel or DiMatteo is a realistic, functional, reliable means or a method for maintaining a balance to provide a dynamic equality of fluid added and fluid removed by replacing aged fluid with fresh fluid through an opened transmission cooler line without disrupting normal internal and external flow rates and flow distribution patterns.

It may be noted that in the event fluid is allowed to drain faster than the rate of addition of fluid, the pump or torque converter in a transmission is likely to be starved and then will become excessively hot under which conditions a transmission will self-destruct if permitted to continue in operation. On the other hand, should excessive fluid be added to build up an internal pressure within the transmission, there is a strong likelihood that seals for shafts and/or valves, bearings, or the like or other internal components, within the transmission, may be irreparably damaged with a resulting failure of the transmission under subsequent operating conditions.

The remainder of the patents are understood to be directed to various and sundry arrangements for adding, removing and changing fluid which are believed to be more remotely related to the concepts of my invention as will be explained in more detail below.

SUMMARY OF THE INVENTION

Briefly, my invention is comprised of a fluid receiver for used fluid, a source of supply of fresh fluid, and a means for coordinating the introduction of fresh fluid with the draining of used fluid. With this in mind, it then only remains necessary to separate the fluid flow in a line that is external from the transmission so that the used fluid is drained into a suitable fluid container and the new fluid is introduced at the same rate that the used fluid exits. This can be accomplished in a number of ways, some of which will be described in more detail below.

In one embodiment of my invention, a tank having one port at each end is divided into two chambers by a flexible diaphragm. The tank is filled with fresh fluid through one port which may be known as the supply port and the diaphragm is distended so that substantially the entire tank may be filled with fresh fluid. The supply port, is then connected to the return line of a transmission, the fluid of which is to be renewed. The other port is connected to a drain or exhaust line and the transmission is rendered operative and under these conditions, fluid will be driven from the transmission to the drain line through the drain port of the tank to exert a pressure therein on the diaphragm which will then cause the supply of fresh fluid to flow into the return line and thence back into the transmission. It may now be abundantly clear that the fluid removed is exactly equal to the fluid added so that the transmission will be completely filled with fluid without any excessive pressure drops across sealed shafts or valves and will remain operative in its normal manner with the usual flow rates and flow distribution patterns external to and internally within the transmission and its component parts.

In a typical replacing operation, the fluid drained may be visually observed until the appearance or color assumes that of fresh fluid and the operator will then know that the fluid within the transmission consists essentially, entirely of fresh fluid having the required lubricating and additive properties.

Typically, an amount of fresh fluid in excess of the fluid capacity of a transmission is necessary because of the dilution factor which may vary from transmission to transmission but which is always present. This may vary from 25 to 75 percent of the capacity of a transmission.

In another embodiment of my invention, a pneumatic cushion is provided intermediate individual receptacles for receiving used fluid and adding new fluid while pressure within the receptacles is maintained at a predetermined level commensurate with the normal operating pressure of the fluid in a given transmission.

In a further embodiment of my invention, the apparatus for draining used fluid is provided with a suitable restriction for permitting or controlling the discharge of used fluid so as to maintain, in effect, a back pressure on the circulation pump in a transmission so that the fluid removed by the draining procedure does not exceed the internal source of supply for the pump, which is being replaced at a level consistent with the volume of fluid that is drained. The fresh, clean fluid that is returned to the transmission is then supplied at a rate which is equal to or greater than the volume of expended, dirty fluid that is drained at a controlled rate. A controller, such as is described in one of the illustrated embodiments may be utilized for this purpose.

BRIEF DESCRIPTION OF THE DRAWINGS

FIG. 4 is a side elevational view, partly in section, illustrating a further embodiment of my invention;

FIG. 5 is an accessory which may be utilized in practicing my invention; and

FIG. 6 is an enlarged side elevational view, party in section, illustrating a still further embodiment of my invention.

DESCRIPTION OF THE ILLUSTRATED EMBODIMENTS

Figure 1:
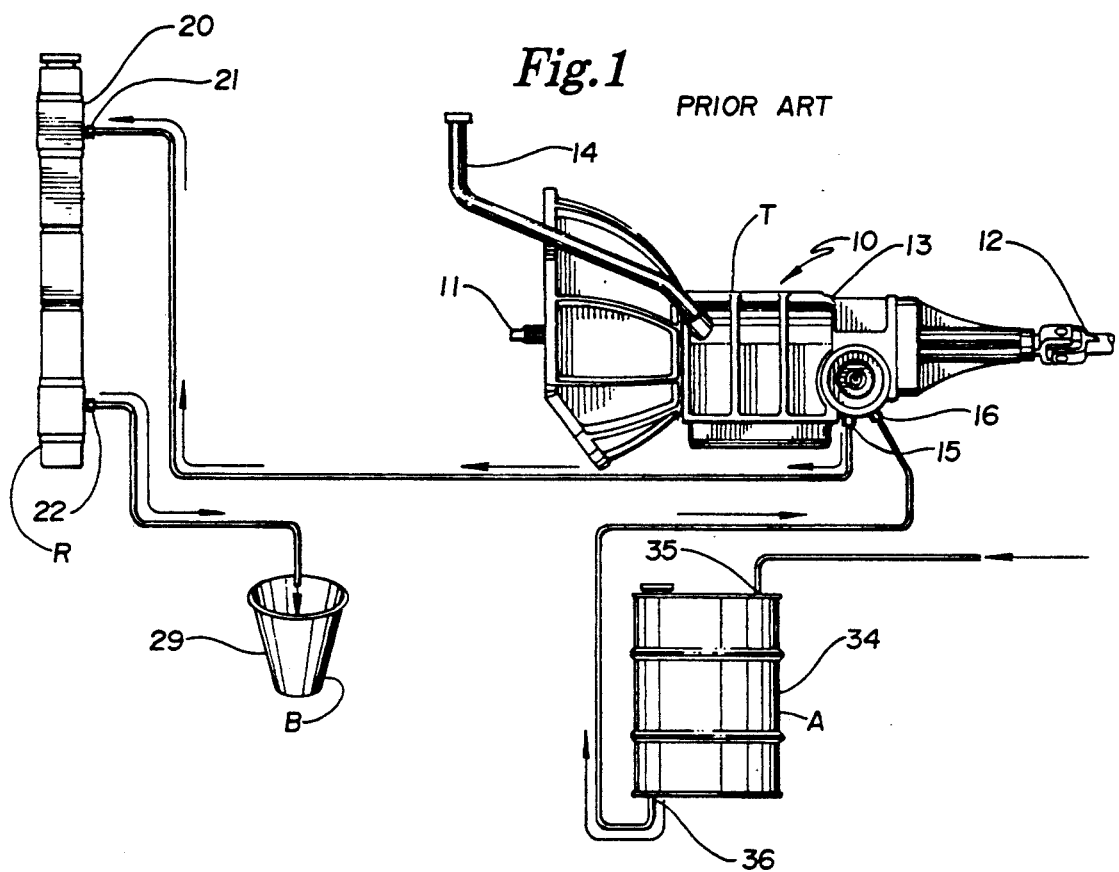
FIGS. 1 and 2 are sketches of prior art devices as described above.
Figure 2:
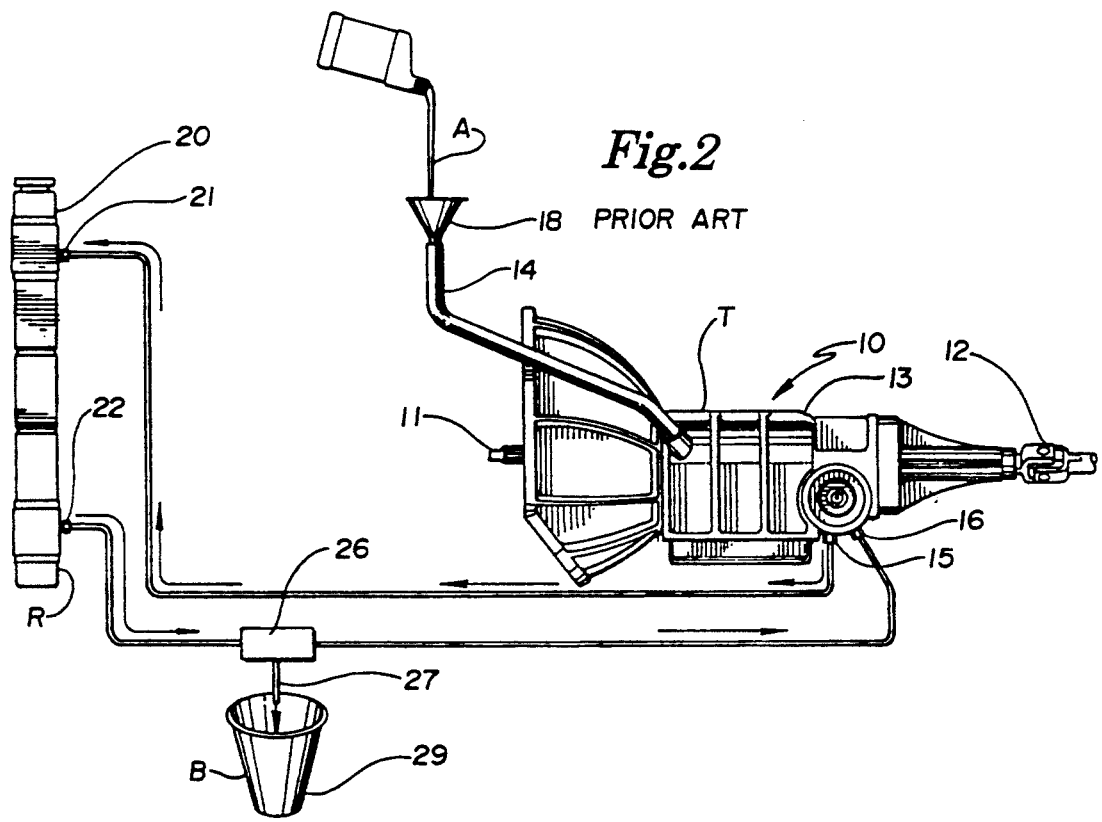

Referring to FIGS. 1 and 2 of the drawings two illustrations of the prior art are used in connection with a typical automatic transmission 10 having a case 13 and a fluid filler tube 14, a fluid outlet 15, and a fluid inlet 16, and an input shaft 11, and output shaft 12. The fluid outlet and inlets for the transmission are typically utilized to circulate fluid under pressure from within transmission 10 to a means for extracting excess heat from the transmission fluid used in the operation of the transmission. This is typically done by a section of an automotive radiator having an inlet 21 and an outlet 22. Inlet 21 is directly connected to fluid outlet 15 on transmission 10 through a suitable tubular member. In FIG. 1, outlet 22 is permitted to drain unrestricted and unregulated into a bucket 29 for receiving used transmission fluid. A tank 34 comprises a source of fresh transmission fluid, also indicated by reference character A and includes an outlet 36 that is connected to inlet 16 on transmission 10 through a suitable tubular member and a pressure inlet 35 that is connected to a suitable source under pressure (not shown).

In FIG. 2, a valve 26 is shown connected to outlet 22 on radiator 20 and is operable to direct the flow of fluid to an outlet 27 which exhausts used fluid unrestricted and unregulated into bucket 29 or to another outlet which is connected to inlet 16 on transmission 10 through a suitable tube.

Further, in the prior art of FIG. 2, a source of fluid is shown comprised of a funnel 18 (also indicated as a fresh fluid source A) which is inserted into the top of filler tube 14 on transmission 10 for the addition of fluid thereto. The top of funnel 18 is supplied with fluid from a suitable container, such as the bottle shown.

Figure 3:
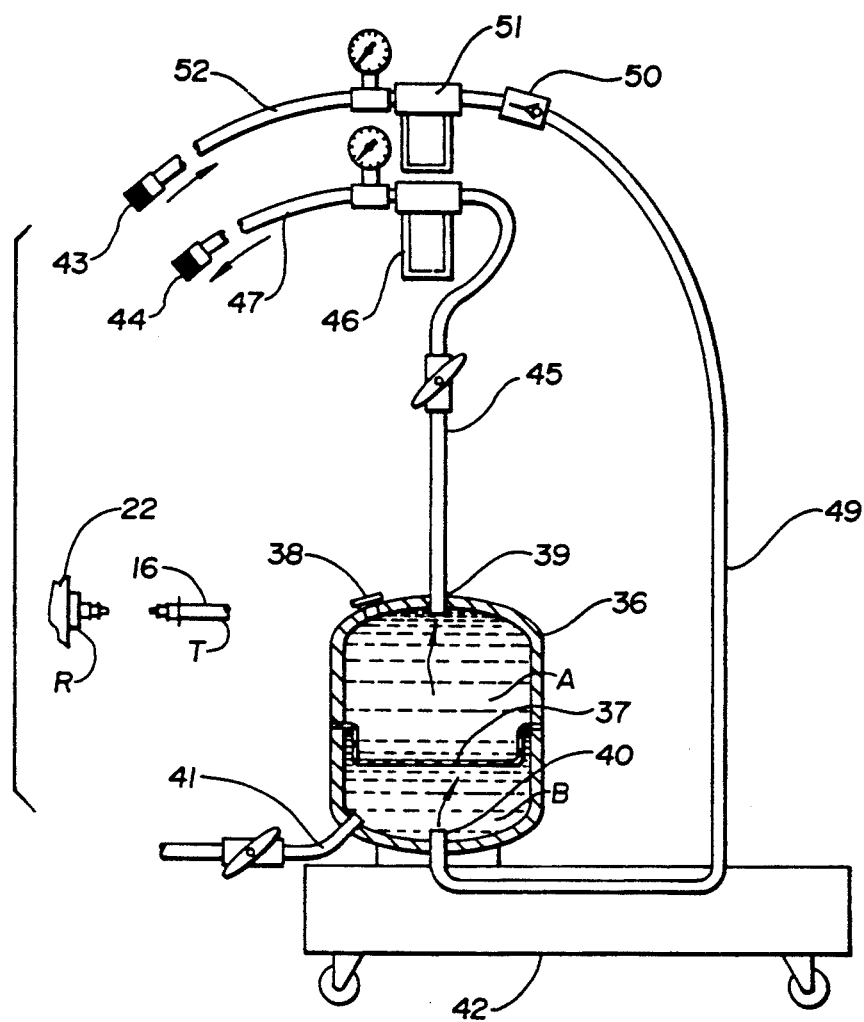
FIG. 3 is a side elevational view, partly in section, illustrating my invention.

In the embodiment of FIG. 3, a tank 36, having a flexible, rubber-like diaphragm 37, a top filler tube 38 and an outlet port 39 at the top end an inlet port 40 and a drain port 41 at the lower end is disposed in a generally-vertically oriented attitude on top of a wheeled cart 42. A fluid supply tube 45, including an on-off valve is shown disposed intermediate outlet port 39 and a sight glass 46 that is, in turn, connected to a further supply tube 47 having a quick connect mechanism 44 for connection to a radiator port 22 or a transmission port 16, each adopted to connect with connector 44. A drain tube 49 is shown connected to inlet port 40 on the lower end of tank 36 and includes a check valve 50 which is, in turn, connected to another sight glass 51 which is connected to a further drain tube 52 having a connector 43 at its end and adapted for connection to port 22 on radiator 20 or port 16 on transmission 10. Check valve 50 is oriented to permit the flow of used fluid through drain tube 52, sight glass 51, check valve 50, and drain tube 49 to inlet port 40 on the lower end of tank 36. The upper portion of tank 36 is designated as a fresh supply tank A and the lower portion is designated as a used fluid receiver B.

In FIG. 4, a fresh fluid tank 61 and a used fluid tank 71 are shown mounted upon cart 42 and are connectable, respectively, to ports 22 or 16 on radiator 20 and transmission 10, depending upon the direction of fluid flow in the line from transmission 10 through inlet port 16 to outlet port 22 on radiator 20.

Tank 61 includes a filler tube 62 and an outlet 63 disposed at the top end. A fresh fluid supply tube 64 extends downwardly into tank 61 to a point near its bottom and tank 61 has been designated with the reference character A to indicate it is a source of fresh, clean transmission fluid. The top of tank 61 is connected to a quick release mechanism 65 which is, in turn, connected to the lower end of a shrouded pass through T 66 and it may be seen that tube 64 extends upwardly to supply tube 45 through the interior of shrouded T 66 and the interior of shrouded T 66 is in fluid communication with the upper end of tank 61.

Tank 71 is provided with an inlet port 72 at its upper end and a drain port 73 at its lower end. A drain tube 74 extends downwardly into tank 71 although it need not extend for any particular distance. A quick connect mechanism 75 is connected to the upper end of inlet port 72 and to the lower end of shrouded and pass through T 76. The upper end of tube 74 extends upwardly to connection with drain tube 49. A T 79 is shown between the side outlets on shrouded Ts 66 and 76 through tubes 80 and 81. The upper end of T 79 is connected to a further T 82 which has a gauge 83 disposed at one outlet and a Schrader valve 84 connectable to an air hose 85 which is connected to the output of an air regulator 86 connected to a source of air under pressure 87. Tanks 61 and 71 are supported through a bracket means 68, the entire assemblage being suitably disposed upon the top of wheeled cart 42.

FIG. 5 illustrates a means of determining the pressure existing intermediate outlet port on radiator 20 and inlet port 16 on transmission 10 and includes a T 55 that are connected to quick connectors 43 and 44 and sight glasses 46 and 51 through tubes 58 and 57 respectively. A suitable outer gauge 56 is shown connected to the other port on T 55.

It may now be appreciated that the expended, dirty fluid is drained as substantially the same rate as clean, fresh fluid is added. It is anticipated that substantially the same results may be obtained by, for example, replacing shrouded Ts 66 and 76 with appropriate flow controllers, the operation of which may be synchronized. In any event, the limiting of the flow of the used fluid to a drain waste receiver is typically limited to establishing and retaining a back pressure of substantially the internal pump pressure of the transmission undergoing a fluid replacing operation.

In the embodiment of FIG. 6, tank 61 is connected to a source of air under pressure through a regulator 86, the output of which is connected to tube 78 (not shown) which is, in turn, connected to gauge 77 and to tube 81, through shrouded T 66 and quick connect 65 to the top of tank 61. Tank 71 is left connected to the regulated source of air under pressure through tube 85, connector 84, tube 80, shrouded T 76, and connector 75 to the top of tank 71.

Operation of the Illustrated Embodiments

Referring to FIGS. 3 and 4 of the drawings, when a transmission 10 has been designated for a periodic maintenance procedure, the preliminary operations customarily undertaken include an inspection of the filter by removal of the fluid pan, inspection of the fluid therein to determine the wear and conditions to which the transmission has been subjected and then a complete renewal of the fluid for the entire transmission with clean fresh fluid after the filter has been renewed and the pan reinstalled. This is accomplished in the embodiment of FIG. 3 by providing quick disconnect fittings in one of the two fluid lines extending from a transmission to an external fluid cooler, such as the radiator on an automobile, and providing suitable connects to drain tube 52 and supply tube 47 for tank 36. Tank 36 has previously been completely drained of old fluid in the lower portion and filled with clean fresh fluid with the upper portion. After the proper connections have been made, the automobile is suitably chocked, braked, and the engine started and the transmission placed in drive. This causes the pump in the transmission to pump fluid to the outlet and inlet ports for circulating the fluid from the transmission to the fluid cooling means and, since tank 36 is connected in series with one of the fluid lines, fluid will be pumped into drain line 52, through sight glass 51 and check valve 50 to drain line 49 and into the lower portion, B, of tank 36 to exert a force upon diaphragm 37 to cause fresh clean fluid from the upper portion, A, of tank 36 to fluid supply tube 45 through sight glass 46 and fluid supply tube 47 to connector 44 and then to transmission 10. Since the pressure is dictated by the pump in transmission 10, the used fluid will be pumped into tank 36 as fresh clean fluid is returned to the transmission from tank 36 at the normal pressure existing in transmission 10. As the procedure is initiated, the used fluid in sight glass 51 will have a substantially different appearance from the clean fresh fluid passing through sight glass 46. When the visual characteristics of the fluids passing through sight glasses 51 and 46 are substantially the same, the transmission is placed in "park" (neutral), the engine is turned off and the procedure is now complete in that all of the fluid now present in transmission 10 will be fresh clean fluid which may then serve its lubricating, cleansing, maintenance and rehabilitation functions within transmission 10. Experience has shown that many malfunctioning transmissions which had been subjected to filter changing and limited fluid changing continued to malfunction. However, through applying the principles of my invention to provide a complete new charge of fresh, clean transmission fluid, many such malfunctioning transmissions were observed to regain their original operational characteristics.

In practicing the principles and apparatus of FIGS. 4 and 5, the pressure existing in intermediate outlet 22 on radiator 20 and inlet 16 on transmission 10 is determined by providing the appropriate quick connect-disconnect fittings thereon and inserting the apparatus of FIG. 5 in between the ports, energizing the transmission, putting it in gear, and idle and determining the pressure existing and the flow direction in that part of the system. The device is then disconnected and the apparatus of FIG. 4 substituted, taking into account direction of flow, as the flow direction in any given transmission installation may be reversed from that illustrated in my drawings and, it will be seen that my apparatus be connected up properly to receive used fluid and to supply clean, fresh fluid in the right amounts and at the right locations. Assuming the direction of flow is out of outlet 22 on radiator 20 and into inlet 16 on transmission 10, connector 43 is connected to outlet 22 and connector 44 is connected to inlet 16. The transmission is de-energized or shut off at this time and air under pressure is introduced through air tube 85 and Schrader valve 84 to charge my fluid changing apparatus to the pressure of the particular transmission. It is assumed, that tank 71 has been emptied by the opening of the valve to its drain port 73 and that tank 61 has been filled with fresh fluid through inlet 62. At this time, the valve in fluid supply line 45 is closed and check valve 51 is operable to prevent reverse flow of any fluid that may be present in tank 71 so that the two tanks and their interconnection through T 79 are effectively isolated from the atmosphere and the remainder of the system and air, at the pressure of the normal transmission operation as determined in the previous step, is free to circulate intermediate the tops of tanks 61 and 71 through the connections extending from T 79.

My system is now ready for a renewing or replacing of the fluid in a transmission. The automobile engine is again started and caused to run at idle and the transmission is placed in gear while the car is suitably chocked and braked and the valve on supply tube 45 is opened. Used, dirty transmission fluid will flow into tube 52 through check valve 51 and into the bottom of tank 71 and simultaneously the air disposed in tank 71 will be drive to the top of tank 61 so that it may cause the fluid of supply A to move upwardly through supply tube 64, sight glass 46, supply tube 47 and to inlet 16 on transmission 10 through quick connector 44. The process will continue until the fluid flowing through sight glasses 61 and 46 assumes substantially the same appearance at which point the operator will realize that the fluid has been completely renewed or replaced, the automobile engine turned off, the transmission returned to the "park" (neutral) position and the apparatus may then be disconnected. The used, dirty fluid B may then be discharged through port 73 on tank 71 and clean fresh fluid A may be placed in tank 61 through inlet 62 and the apparatus is ready for another fluid replacing procedure.

In the operation of the embodiment of FIG. 6, the direct connection intermediate tanks 61 and 71 has been replaced by independent connections to a source or sources of air under pressure 87 so that the top of tank 71 may be supplied with air under pressure which further controls through the operation of a relief valve 70 connected through T 79 to the top of tank 71 so as to maintain a constant pressure no greater than the pressure that may be supplied from the source of air under pressure or relief of valve 86. In this manner, as tank 71 is filled with used fluid, the pressure will not rise and the flow will remain substantially that caused by the pressure of the internal pressure of transmission 10.

In summary, my method is accomplished by interrupting a line extending from a transmission body to a fluid cooler; measuring the fluid flow characteristics as by direction and rate or the like; restricting the flow of used fluid to the normal rate as the fluid is permitted to drain from the line to a receptacle; and adding fresh fluid into the line to the transmission at the same flow rate.

I claim:

1. In a fluid replacing apparatus for an automatic transmission an improvement having fluid circulation inlet and outlet ports comprising;
    a fluid receiver adapted to be connected to the fluid circulation output port on said automatic transmission;
    a source of fresh transmission fluid adapted to be connected to the fluid circulation inlet port on said automatic transmission so that fluid circulates therethrough; and
    means connected to said fluid receiver and said source of fresh fluid, for equalizing the fluid flow into said fluid receiver and out of said source of fluid.

2. The apparatus of claim 1 in which the means for equalizing the fluid flow includes means for establishing a predetermined pressure in the source of fresh fluid that is related to the pressure of the fluid circulating through the transmission.

3. The apparatus of claim 1 in which the means for equalizing the fluid flow includes means for restricting said flow of fluid from the fluid circulation outlet port.

4. The apparatus of claim 1 in which the means for equalizing the flow of fluid into and out of the inlet and outlet ports of said transmission includes flow restriction means.

5. The apparatus of claim 4 in which the flow restriction means is adjustable.

6. The apparatus of claim 5 in which the flow restriction means is disposed intermediate the outlet port and the fluid receiver.

7. The apparatus of claim 6 in which the flow restriction means includes an adjustable flow control.

8. The apparatus of claim 6 in which the flow restriction means includes an adjustable pressure control.

9. The apparatus of claim 4 in which flow restriction means is disposed intermediate said inlet port and the source of transmission fluid.

10. The apparatus of claim 4 in which the flow restriction means is an adjustable flow control.

11. The apparatus of claim 10 in which the flow restriction means includes an adjustable pressure control.

12. The apparatus of claim 4 in which fluid restriction means is disposed intermediate the fluid receiver and the outlet port and the source of fluid and the inlet port.

13. The apparatus of claim 1 in which the means for equalizing the flow is comprised of means disposed intermediate the fluid receiver and source, said means exhibiting resilient characteristics for exerting a force, related to the pressure existing in the fluid circulation circuit of said transmission and said receiver, upon the fluid in said source.

* * * * *